(12) United States Patent  
Xu et al.

(10) Patent No.: US 7,050,646 B2  
(45) Date of Patent: May 23, 2006

(54) IMAGE PROCESSING SYSTEM AND METHOD FOR IMAGE SEGMENTATION USING INTENSITY CONTRAST AND DEPTH CONTRAST VALUES

(75) Inventors: Li-Qun Xu, Ipswich (GB); Ebroul Izquierdo, London (GB)

(73) Assignee: British Telecommunications public limited company, London (GB)

( * ) Notice: Subject to any disclaimer, the term of this patent is extended or adjusted under 35 U.S.C. 154(b) by 669 days.

(21) Appl. No.: 10/129,788

(22) PCT Filed: Dec. 8, 2000

(86) PCT No.: PCT/GB00/04707

§ 371 (c)(1),  
(2), (4) Date: May 10, 2002

(87) PCT Pub. No.: WO01/43071

PCT Pub. Date: Jun. 14, 2001

(65) Prior Publication Data

US 2002/0175921 A1 Nov. 28, 2002

(30) Foreign Application Priority Data

Dec. 10, 1999 (GB) .................................. 99309943

(51) Int. Cl.  
*G06K 9/40* (2006.01)

(52) U.S. Cl. ...................... 382/254; 382/154; 348/619; 358/1.9

(58) Field of Classification Search ................ 382/254, 382/154; 348/606–624; 358/1.9–3.31, 447, 358/461, 463  
See application file for complete search history.

(56) References Cited

U.S. PATENT DOCUMENTS 5,727,078 A * 3/1998 Chupeau .................... 382/154  
6,556,704 B1 * 4/2003 Chen .......................... 382/154  
6,606,406 B1 * 8/2003 Zhang et al. ............... 382/154

OTHER PUBLICATIONS

Ebroul, IEEE 1999, "Disparity/Segmentation Analysis:Matching with an adaptive window and depth driven segmentation". (pp. 589-607).*

(Continued)

*Primary Examiner*—Kanjibhai Patel  
*Assistant Examiner*—Manav Seth  
(74) *Attorney, Agent, or Firm*—Nixon & Vanderhye P.C.

(57) ABSTRACT

A method and system for processing an image recorded by an imaging device may include: a) providing an image having an array of adjacent elements each corresponding to a respective part of the image and having a respective intensity value associated therewith; b) processing the intensity values to determine an intensity contrast value for each respective element according to differences in intensity values between respective adjacent elements; c) determining a depth value for each element corresponding to the distance between the imaging device and at least part of an image forming object represented in the image by the respective element; d) processing the depth values to determine a depth contrast value for each respective element according to differences in depth values between respective adjacent elements; and, processing the intensity contrast values and depth contrast values to identify at least one area of the image corresponding to one or more respective objects in the image being processed. The last noted process step can be a non-linear diffusion process whereby variations in grey level values are diffused in regions corresponding to objects or background and enhanced in regions corresponding to object boundaries.

17 Claims, 9 Drawing Sheets

OTHER PUBLICATIONS

Ghanbari et al., IEEE 1999, "Motion-driven object segmentation in scale-space". (pp. 3473-3476).*

Imme, 1991, "A noise peak elimination filter". (pp. 204-211).*

Baxes, Book Publication, 1994, "Digital image processing: principles and application". (pp. 62-64. 73-77, 123-155. 330-334).*

Acton et al., IEEE, 1994, "Anisotropic diffusion pyramids for image segmentation".(pp. 478-482).*

Yokoya et al., IEEE, 1989, "Range image segmentation based on differential geometry: a hybrid approach". (pp. 643-649).*

* cited by examiner

IMAGE PROCESSING SYSTEM AND METHOD FOR IMAGE SEGMENTATION USING INTENSITY CONTRAST AND DEPTH CONTRAST VALUES

This application is the US national phase of international application PCT/GB00/04707 filed 8 Dec. 2000 which designated the U.S.

BACKGROUND

1. Technical Field

This invention relates to image processing and in particular to a system and method for processing digital images to detect and extract physical entities or objects represented in the image.

2. Related Art

Image segmentation is of fundamental importance to many digital image-processing applications. The process of image segmentation refers to the grouping together of parts of an image that have similar image characteristics and this is often the first process in image processing tasks. For instance, in the field of video coding it is often desirable to decompose an image into an assembly of its constituent object components prior to coding. This pre-processing step of image segmentation then allows individual objects to be coded separately. Hence, significant data compression can be achieved in video sequences since slow moving background can be transmitted less frequently than faster moving objects.

Image segmentation is also important in the field of image enhancement, particularly in medical imaging such as radiography. Image segmentation can be used to enhance detail contained in an image in order to improve the usefulness of the image. For instance, filtering methods based on segmentation have been developed for removing noise and random variations in intensity and contrast from captured digital images to enhance image detail and assist human visualisation and perception of the image contents.

Other fields where image segmentation is important include multi-media applications such as video indexing and post production content-based image retrieval and interpretation, that is to say video sequence retrieval based on user supplied content parameters and machine recognition and interpretation of image contents based on such parameters.

Fundamental to image segmentation is the detection of homogeneous regions and/or the boundaries of such regions which represent objects in that image. Homogeneity may be detected in terms of intensity or texture, that is grey level values, motion (for video sequences), disparity (for stereoscopic images), colour, and/or focus for example. Many approaches to image segmentation have been attempted including texture-based, intensity-based, motion-based and focus-based segmentation. Known approaches require significant computational resources and often provide unsatisfactory results.

One approach that uses intensity or grey level values for object segmentation is thresholding. The concept of image segmentation based on thresholding is described in the paper "An Amplitude Segmentation Method Based on the Distribution Function of an Image", Compute, Vision, Graphics and Image Processing, 29, 47–59, 1985. In the thresholding method intensity values are determined for each pixel or picture element in a digital image and on the basis of these values a threshold value is determined that distinguishes each pixel of an object in the image from pixels representing background detail. In practice, the threshold intensity value is determined dynamically for each image according to the statistical distribution of intensity values, that is to say, the value is based on a histogram analysis of all the intensity values for a particular image. Peaks in the histogram distribution generally represent intensity values predominately associated with a particular object. If two objects are present in an image there will be two peaks. In these circumstances the intersection or overlap between the two peaks is taken as the threshold value. This approach to image segmentation is relatively straightforward but can be computationally intensive particularly when complex images are presented, for example, images comprising a number of objects or complex backgrounds or when the image is heavily "textured", that is to say, the image comprises a number separate regions within an object that have different intensity values. When textured images are processed using threshold-based methods "over-segmentation" can occur, that is, regions within an object are themselves recognised as separate objects within the image being processed.

The problem of over segmentation can be partially overcome if the image is simplified prior to thresholding. Image simplification involves the removal of low order intensity value differences between adjacent pixels within an object boundary while the intensity value differences are maintained at the object boundaries. Image simplification is often achieved in digital image processing by using so called non-linear diffusion methods. The concept of non-linear diffusion for image processing is described in the published paper "Scale Space and Edge Detection Using Anisotropic Diffusion", IEEE Trans. on Pattern Analysis and Machine Intelligence Vol. 12 No. 7 pp629–639, July 1990. In this method pixel intensities are altered in a manner analogous to diffusion of physical matter to provide regions of homogenous intensity within object boundaries while preventing diffusion at the object boundaries, thereby preserving intensity contrast at the boundaries. It has been found, however, that methods of image simplification based on known non-linear diffusion algorithms result in over segmentation.

BRIEF SUMMARY

According to a first aspect of the invention there is provided a method of processing an image recorded by an imaging device; said method comprising the steps of:

a) providing an image comprising an array of adjacent elements each corresponding to a respective part of the image and having a respective intensity value associated therewith;

b) processing said intensity values to determine an intensity contrast value for each respective element according to differences in intensity values between respective adjacent elements;

c) providing a depth value for each element corresponding to the distance between the imaging device and at least part of an image forming object represented in the image by the respective element;

d) processing said depth values to determine a depth contrast value for each respective element according to differences in depth values between respective adjacent elements; and, e) processing said intensity contrast values and said depth contrast values to identify at least one area of the image corresponding to one or more respective objects in the image being processed.

Thus, by processing depth contrast values with the intensity contrast values, data relating to the relief of an image, that is the depth of image forming objects (or more precisely the distance travelled by the reflected incident radiation) in the image, can be used to improve object boundary detection and thereby improve segmentation of the image into its constituent object parts. By using two parameters instead of one the accuracy of determining object boundaries can be significantly improved.

Preferably, said depth values are determined according to the spacing between corresponding points on a stereoscopic image pair. The spacing between corresponding points can be readily converted into depth values based on known imaging system geometry. Hence, additional image processing can be minimised.

In a preferred embodiment, the spacing between said points is determined by matching said corresponding points and estimating a vector value for the relative spacing and direction of said points. In this way, respective vector values can be used to represent the respective depth values associated with the respective elements.

Conveniently, said area is determined by identifying an outline of said respective object or objects in the image. This readily provides for object identification.

Preferably, step e) comprises the step of altering the intensity values of each respective element in accordance with the respective intensity contrast value and the respective depth contrast value of the element. This can increase intensity differences between adjacent elements at the respective object boundaries.

In preferred embodiments, the step of altering the intensity values comprises the step of modifying the respective intensity contrast values according to the respective depth contrast values, and altering the intensity values of the respective elements towards an average intensity value determined by the intensity values of surrounding elements if the respective modified intensity contrast value of the element is below a threshold value. This improves image simplification by reducing differences in intensity values between elements corresponding to positions within an object.

Conveniently, the intensity contrast values are modified such that elements having a higher than average depth contrast value have their respective intensity values altered less than elements having a lower than average depth contrast value. This increases the difference in the intensity values between adjacent elements corresponding to positions on opposing sides of object boarders.

Preferably, step e) comprises a non-linear diffusion process for altering element intensity values in accordance with respective intensity contrast values modified in accordance with respective depth contrast values. In this way, it is possible to improve known non-linear diffusion methods of image simplification by modifying the diffusion process in accordance with further object identifying data, that is to say using the depth data associated with each element.

In a preferred embodiment, the method further comprises the step of delineating said object or objects from the image. This allows the objects to be stored, retrieved, coded, or processed separately, for example.

Preferably, the delineating step comprises the steps of:
determining a statistical distribution function of the altered intensity values of the respective elements;
determining a threshold value or range of values to include all the intensity values of the respective elements of at least one identified area in the image; and,
selecting elements having modified intensity values within the threshold range or above or below said threshold value; and delineating image data relating to said selected elements from image data relating to the remaining elements. In this way it is possible to implement relatively simple thresholding methods to extract the object or objects from the processed image.

According to a second aspect of the invention there is provided a method of processing an image in accordance with a non-linear diffusion process; said method comprising the steps of:

i) providing an image comprising an array of adjacent elements each corresponding to a respective part of the image and having a respective intensity value associated therewith;

ii) processing said intensity values to determine an intensity contrast value for each respective element according to differences in intensity values between respective adjacent elements;

iii) identifying from said array of elements object defining elements corresponding to points on respective objects in the image;

iv) altering said element intensity values in accordance said respective intensity contrast values, whereby said elements are altered to a lesser or greater extent in dependence on whether said respective element is an object element.

In one embodiment, step iii) comprises the step of determining a depth value associated with a disparity field for each element in the image and identifying said object elements from said depth values.

In another embodiment, step iii) comprises the step of determining a motion value associated with a motion vector in a video sequence for each element in the image and identifying said object elements from said motion values. Accordingly, the non-linear diffusion process can be modified in accordance with object positions determined by motion recorded in a video sequence.

According to a third aspect of the present invention there is provided an image processing system for processing an image recorded by an imaging device; said system comprising:

a) a data receiver for receiving data relating to an image comprising an array of adjacent elements each corresponding to a respective part of the image and having a respective intensity value associated therewith;

an intensity value processor configured to determine an intensity contrast value for each respective element according to differences in intensity values between respective adjacent elements;

a depth value processor configured to determine a depth value for each element corresponding to the distance between the imaging device and at least part of an image forming object represented in the image by the respective element;

a depth contrast value processor configured to determine a depth contrast value for each respective element according to differences in depth values between respective adjacent elements; and, an object segment processor configured to process intensity contrast values and said depth contrast values to identify at least one area of the image corresponding to one or more respective objects in the image being processed.

BRIEF DESCRIPTION OF THE DRAWINGS

The invention will now be described, by way of example only, with reference to the accompanying drawings; in which:

FIG. 5d is a processed image of the image of FIG. 5a processed in accordance with a modified non-linear diffusion process utilising the disparity data represented in FIG. 5c; and, FIG. 5e is shows an object mask extracted from the processed image of FIG. 5a.

DETAILED DESCRIPTION OF EXEMPLARY EMBODIMENTS

Figure 1:
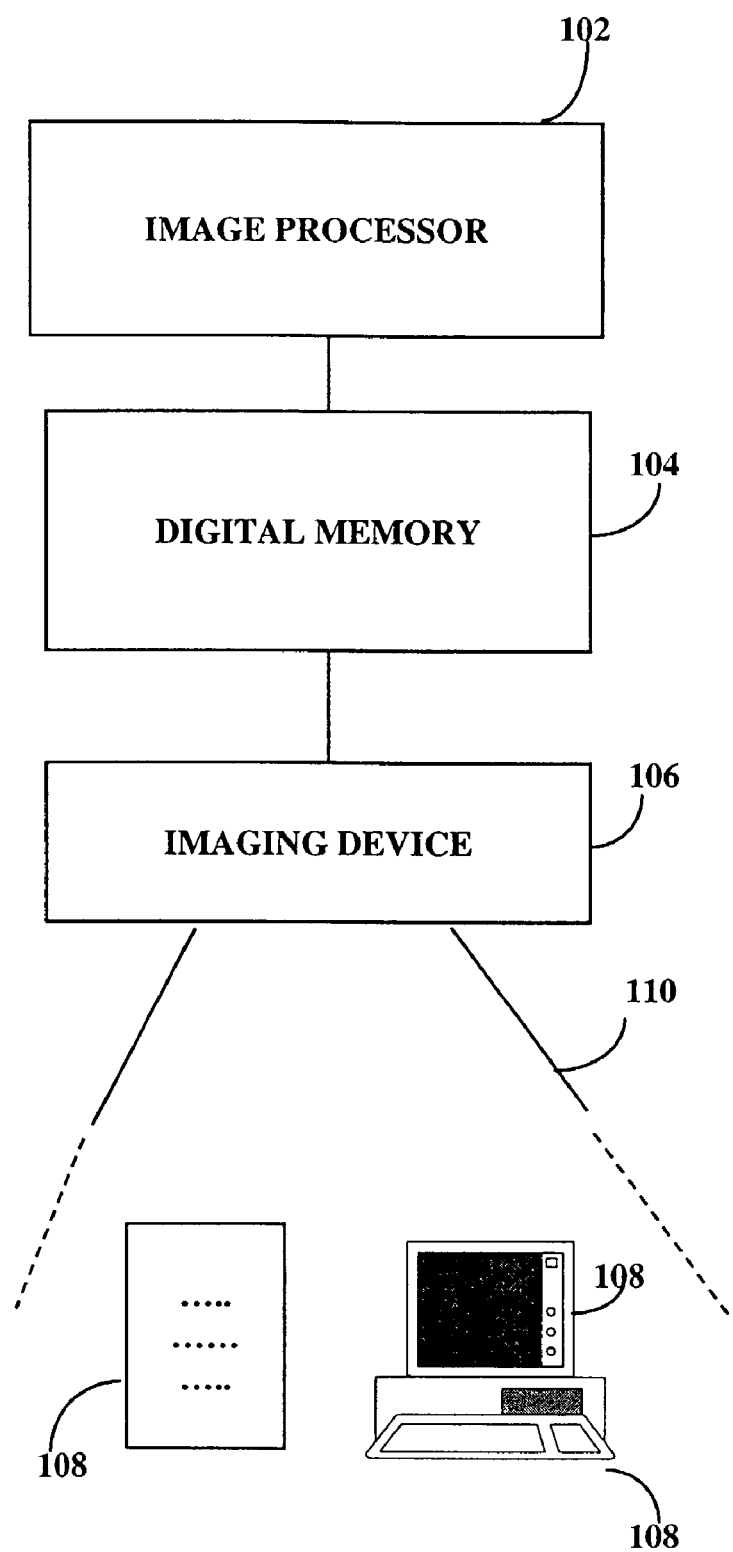
FIG. 1 is a schematic block diagram of a system for processing digital images.

With reference to FIG. 1, in one arrangement of the present invention an image processor 102 is arranged to receive digital images from a memory 104 storing two dimensional images of three dimensional scenes recorded by means of an optical-electronic imaging device 106. The imaging device 106 receives electromagnetic radiation from all areas of the scene being recorded including one or more distinct image forming objects 108 within the imaging device's field of view 110. The imaging device can be any device capable of forming optical-electronic images, including for example an array of light sensitive photo-diodes or the like connected to respective charged coupled devices for forming a digital image of picture elements or pixels capable of being stored in electronic digital memory 104. The pixels each have a grey level value associated with them representative of the brightness or intensity of the respective part of the scene they represent. Data relating to the colour associated with each pixel may also be stored in the memory 104.

Figure 2A:
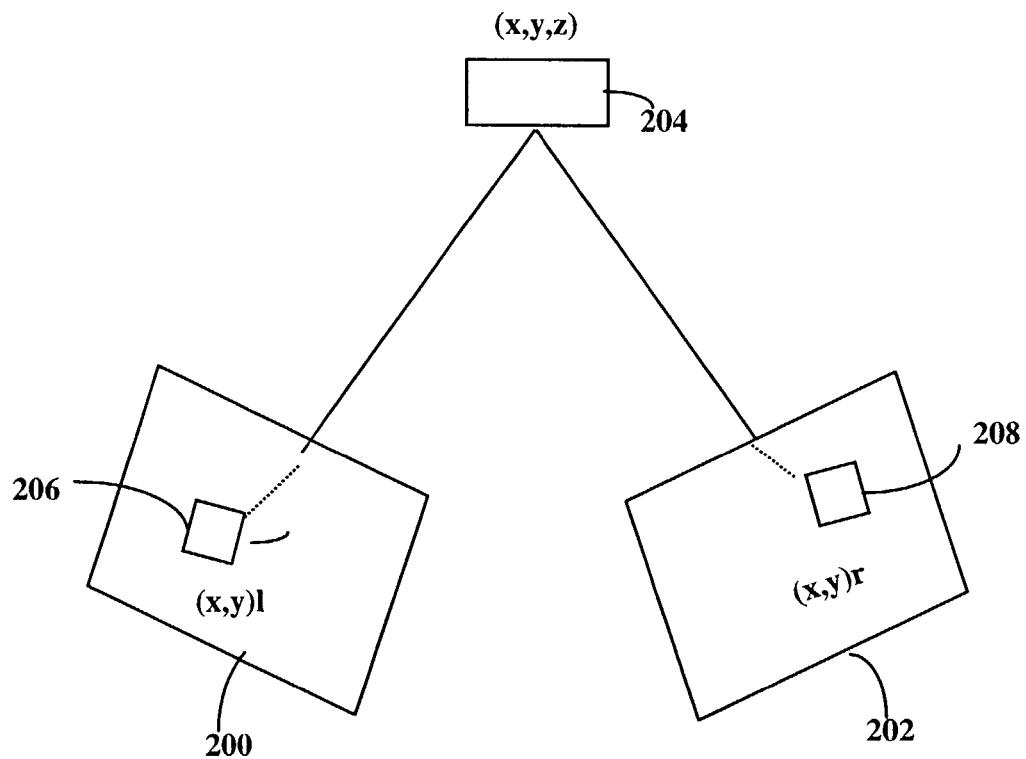
FIG. 2a shows a pair of stereoscopic images of a scene viewed from two different perspectives with a stereoscopic imaging device.

In the present arrangement the imaging device comprises two separate optical-electronic imaging systems for recording stereoscopic image pairs. FIG. 2a shows a pair of images, 200 to the left of the drawing and 202 to the right, that define a stereoscopic image pair corresponding to two different perspective projections in slightly different planes of the same scene. The image processor 102 is programmed in a known manner to process stereoscopic image pairs of the type shown to obtain data relating to the depth of the or each object and the background in a scene, or more precisely, the distance travelled by the incident electromagnetic radiation reflected by the or each object or background to the respective light sensitive pixels of the imaging device. The image processor is programmed to determine disparity vectors in much the same way that conventional image processes are programmed to determine motion vectors for object segmentation prior to video sequence coding. For instance, depth is estimated from the stereoscopic images by estimating a disparity vector for each pair of corresponding points in the image pair. In FIG. 2 a point 204 on an object in a scene has a position defined by the spatial co-ordinates (x,y,z). This point is projected on the left image at a point 206 having the local spatial co-ordinates (x,y)l and likewise on the right image at a point 208 having the spatial co-ordinates (x,y)r. The left and right images have the same co-ordinate reference frame and so the distance and direction between the two corresponding points 206 and 208, known as the disparity vector, can be readily determined.

Figure 2B:
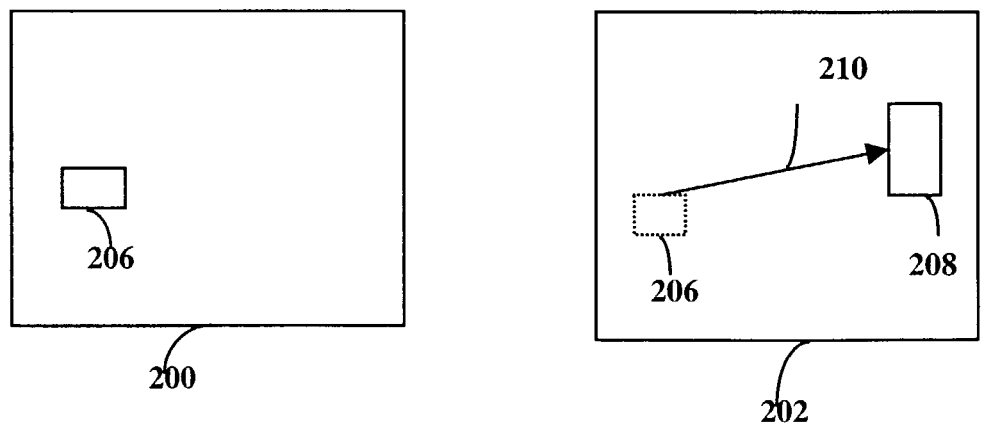
FIG. 2b shows the images of FIG. 2 in side by side relation.

FIG. 2b shows the two images 200 and 202 in side by side relation. The disparity vector 210 for corresponding points 206 and 208 is shown on the right hand image 202. The vector extends between the projected point 206 of image 200 and point 208 on image 202.

It is possible to determine the distance of a point in an image from the disparity vector for that point based on knowledge of the imaging system geometry. The estimation of depth in an image using stereoscopic imaging is described in detail in the paper "Depth Based Segmentation" IEEE Transaction on Circuits and Systems for Video Technology, 7(1), February 1997, pp237–239.

Figure 3:
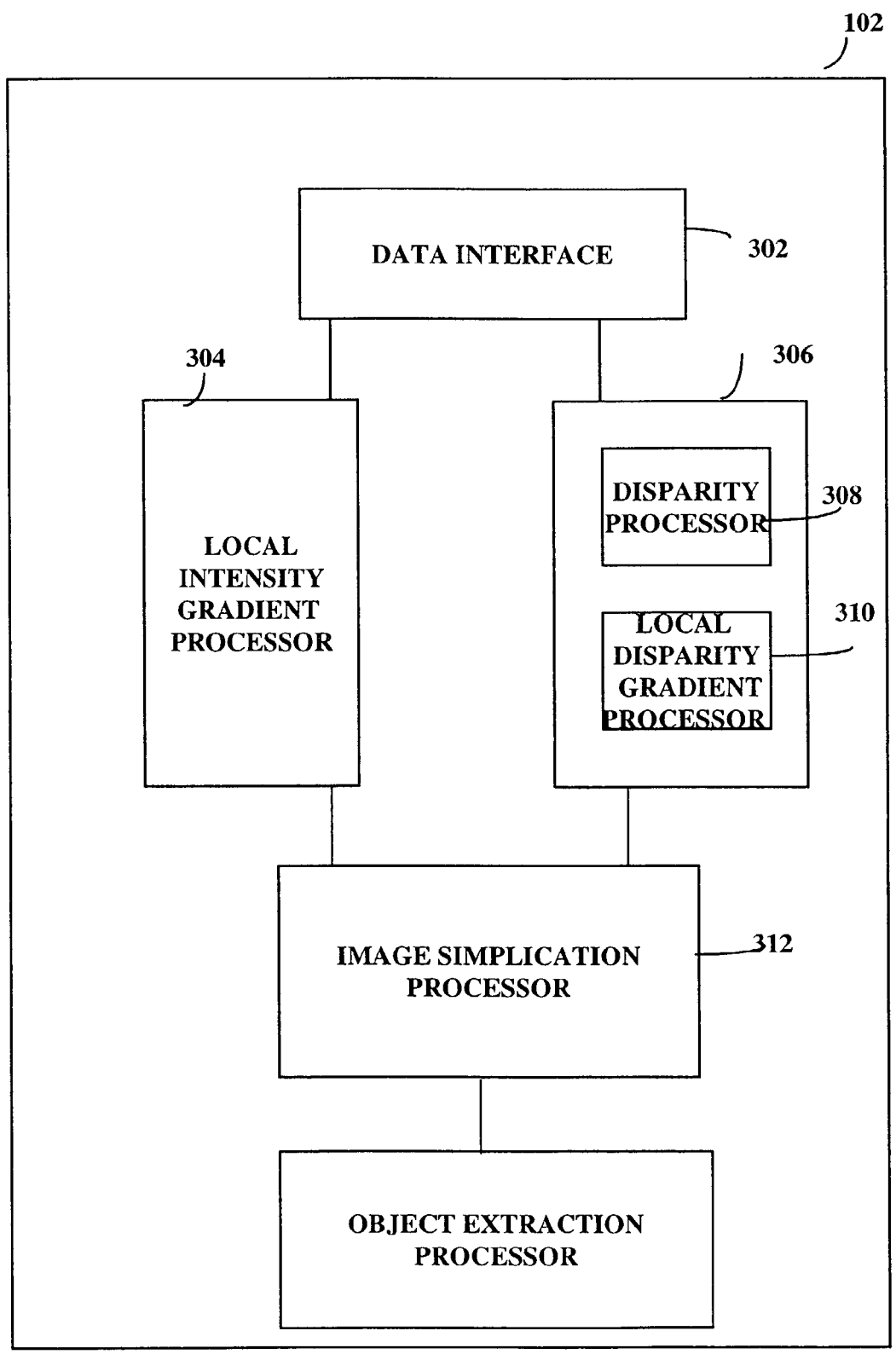
FIG. 3 is a schematic block diagram of an image processor for processing digital images in the system of FIG. 1.

In the arrangement of FIG. 3, the image processor 102 comprises a data receiving interface 302 for receiving data defining stereoscopic image pairs of a scene or sequence of scenes from the memory 104. The data-receiving interface is connected to a first processor 304 which is programmed to determine an intensity contrast value for each of the pixels in one or both stereoscopic images. The intensity contrast value is the intensity or grey level gradient at the respective pixel determined by the local variation in intensity in the adjacent pixels. The receiving interface is also connected to a second processor 306 which includes a first module 308 programmed to determine the disparity vector associated with each pixel and a second module 310 programmed to determine a disparity or depth contrast value for each pixel. The disparity or depth contrast value is the disparity or depth value gradient at the respective pixel determined by the local variation in depth values associated with the adjacent pixels. The first 304 and second 306 processors are connected to a third processor 312 which is programmed to process the image in accordance with a non-linear diffusion process based on the intensity contrast and depth contrast values determined by the respective first and second processors. A fourth processor 314 is connected to the third processor 312 for processing the image data simplified by the processor 312 to delineate and extract groups of neighbouring pixels representing physically meaning entities or objects contained within the image being processed.

The image processor of FIG. 3 is programmed to segment an image by first simplifying the image and then extract objects from the image by histogram based threshold analysis and extraction. An example of an image segmentation method will now be described with reference to the flowchart of FIG. 4.

Data defining a pair of stereoscopic images of a scene or a sequence of images pairs constituting a video sequence are read from memory 104 by the interface 302 of the image processor 102 in step 400. The image data is stored in the memory 104 as a set of grey level values, one for each pixel. In step 402 the grey level values are processed by the processor 304 to determine the local variation in intensity in the region of each respective pixel to determine a respective contrast value for each of the pixels. Subsequently or simultaneously, image data defining an image pair is processed by the processor 306, first in step 404 by processor 308 to determine respective disparity vectors 210, and second in step 406 to determine respective depth contrast values based on the local variation in disparity vector values in the region of each respective pixel. Step 404 can be based on the method disclosed in the paper "Depth Based Segmentation" IEEE Transaction on Circuits and Systems for Video echnology, 7(1), February 1997, pp237–239, the contents of which are incorporated herein by reference.

The image is simplified in step 408 by processor 312 according to a data dependent non-linear diffusion process. Step 408 involves altering the respective pixel intensity values by modifying the respective intensity contrast values according the corresponding depth contrast values determined in steps 402 and 406 respectively. The intensity values are altered towards an average intensity value determined by the intensity values of the respective surrounding pixels if the modified respective contrast value for the pixel is below a certain value. In this regard, the intensity contrast values are modified such that pixels having a higher than average depth contrast value have their respective intensity values altered less than elements having a lower than average depth contrast value. Since step 408 is analogous to a physical diffusion process the step is iterative and repeats until a pre-determined equilibrium is achieved. The process of step 408 ultimately provides an image where the intensity values tend to an equilibrium value within the region corresponding to an object within the image, that is to say the or each object is represented by a separate homogeneous region of intensity. The diffusion process is considerably reduced in regions corresponding to object boundaries so that there is significant contrast in intensity between objects and objects and between objects and background within an image of a scene. An example of the process of step 408 is described in greater detail in the example described below.

In step 410 the processed image data of the simplified image is processed by the processor 314 to determine an image segmentation grey level threshold value for image segmentation. In step 412 one or more objects are extracted from the image according to the modified intensity values of the respective pixels. Steps 410 and 412 may be implemented in accordance with the histogram based segmentation method described in the paper "An Amplitude Segmentation Method Based on the Distribution Function of an Image", Compute, Vision, Graphics and Image Processing, 29, 47–59, 1985 mentioned above.

Figure 4:
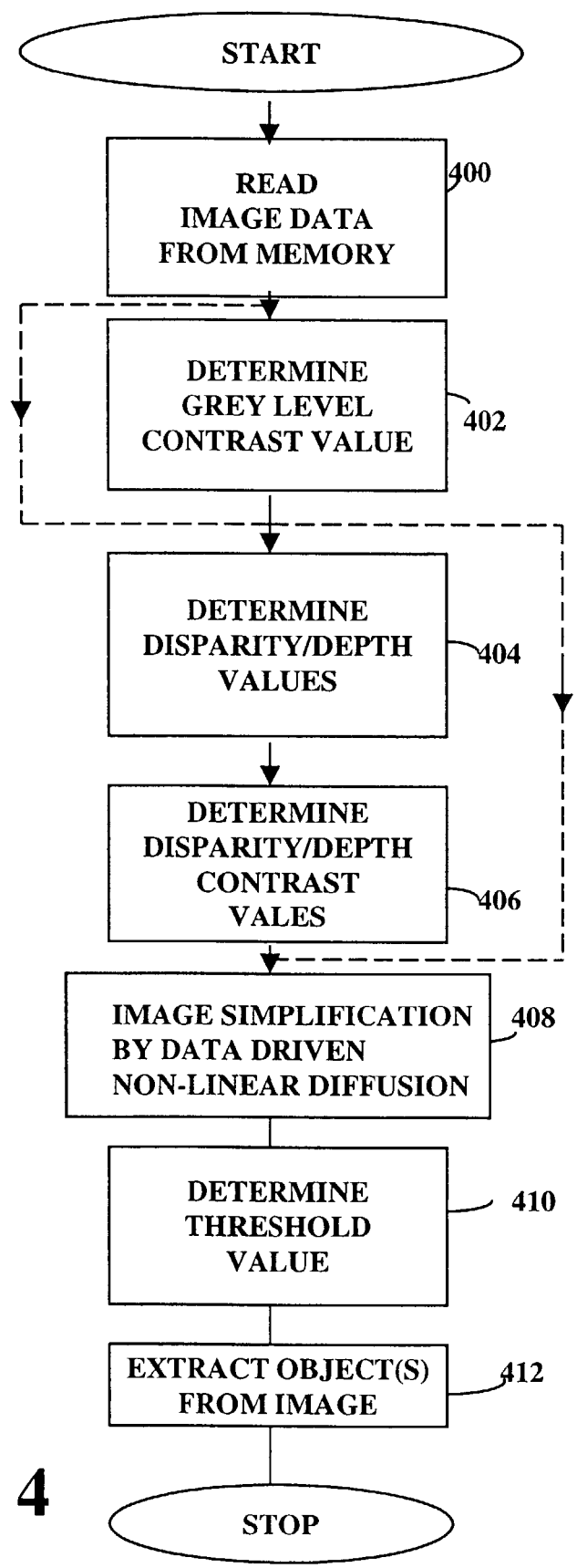
FIG. 4 is a flow chart of a method for processing digital images

In the method described with reference to FIG. 4, an image containing one or more structurally meaningful entities or objects is first simplified, that is to say the image is processed to remove inconsequential detail from the image, and then segmented into regions containing respective entities or objects. In the example described, image simplification is based on a modified non-linear diffusion process involving grey level intensity values of respective picture elements or pixels comprising the image. The process of step 408 will now be described with reference to the following mathematical example.

EXAMPLE

Mathematically the process of diffusion can be described by the following partial differential equation, known as the diffusion equation:

$$I_t = div(\tau \cdot \nabla I) \quad (1)$$

Equation (1) embodies two important properties: first, the equilibration property stated by Fick's law, $\phi = -\tau \cdot \nabla I$, where $\nabla I$ is the concentration gradient, $\phi$ is the flux, and $\tau$ is the diffusion tensor; and second, the continuity property given by $I_t = -div(\phi)$. Thus the concentration $I_t$ is equal to the –ve flux divergent.

In the context of the present invention the concentration $I_t$ or $I(x,y,t)$ is identified as the intensity (grey level value) at any spatial sampling position $I(x,y)$ of the evolved image at a time t.

If the diffusion tensor $\tau$ is constant over the whole image, then Equation (1) describes a linear diffusion model, $$I_t = c \nabla^2 I \quad (2)$$

where c is the diffusion constant and $\nabla^2 I$ the Laplacian of the image intensity.

If the diffusion tensor $\tau$ in Equation (1) is defined as a function of the local energy variation, that is the local image intensity (or grey level value) gradient, at an image position (x, y), $\tau = f(x, y, t)$, a diffusity function, then Equation (1) leads to, $$I_t = \nabla \cdot [f(x,y,t) \nabla I] = div(f(x,y,t) \nabla I) \quad (3)$$

Equation (3) defines a non-linear diffusion process in which local averaging of grey level values is inhibited in regions of object boundaries and diffusion velocity is controlled by the local intensity (or grey level value) gradient. Local averaging is the process of averaging the grey level values of adjacent pixels and replacing the current grey level value of a pixel with this average value.

If the diffusity function f(.) is chosen as a continuously decreasing function of the image gradient, the diffusion process approximates to a constant solution, or equilibrium, representing a simplified image with sharp boundaries. The amount of diffusion in each pixel or image point is modulated by a function of the image gradient at that point. Accordingly, image regions of high intensity contrast undergo less diffusion, whereas uniform regions are diffused considerably.

Equation (3) may be combined together with a rapidly decreasing diffusivity function:

$$f(\|\nabla I\|^2) = \frac{1}{1 + \|\nabla I\|^2 / K^2}, \quad (4)$$

and this diffusivity function leads to a flux function $\phi$ of the form:

$$\phi(\|\nabla I\|^2) = f(\|\nabla I\|^2) \cdot \|\nabla I\| = \frac{\|\nabla I\|}{1 + \|\nabla I\|^2 / K^2}, \quad (5)$$

Where K is a threshold value.

Figure 5A:
FIG. 5a is a pre-processed image of a scene comprising an object to be segmented.
Figure 5B:
FIG. 5b is a processed image of the image of FIG. 5a processed in accordance with a known non-linear diffusion process.

Thus the derivative of equation (5) is positive for $\|\nabla I\| < K$ and negative for $\|\nabla I\| > K$. Consequently the diffusion process behaves in a forward parabolic manner for $\|\nabla I\| < K$, while it behaves in a backward parabolic manner for $\|\nabla I\| > K$. That is, Equation (5) presents a contrasting behaviour according to the magnitude of the image intensity gradient. It will sharpen edges with a local gradient greater than K, while smoothing edges with gradient magnitude lower than K. The value of K can be determined experimentally. FIGS. 5a and 5b show respective pre and post processed images where the image has been processed using the above-defined non-linear diffusion mathematical model.

The above model is improved by using the disparity values associated with the respective pixels since these values vary considerably at object borders. In addition, the accuracy of disparity or depth estimation can be substantially increased at the object borders given the known object outline from the intensity contrast values.

Figure 5C:
FIG. 5c is a processed image of the image of FIG. 5a showing disparity or depth vectors for the image of FIG. 5a obtained from a stereoscopic image pair.

In one example of the present invention the disparity values are used to control the diffusion when non-linear diffusion is applied. FIG. 5c shows the distribution of disparity values for the a stereoscopic image pair corresponding to the image of FIG. 5a. In this representation only the horizontal component of the respective disparity vectors is shown. The magnitude of the vector is represented by grey values. As shown, the approximate position of the object boundaries coincide with the image regions where the disparity variation is high. Thus, by analysing the local variation of the disparity vectors it is possible to detect the position of the respective object borders.

The degree of smoothness $\zeta(z)$ of the disparity vectors at any sampling position $z=(x, y)$, 500 in FIG. 5c, is obtained by measuring the statistical variance of the disparity vectors inside a small observation window 502 centered at position 500. The size of the window 502 is for example 8×8 pixels. The smoothness can be expressed as:

$$\varsigma(z) = \sqrt{\sigma_x^2 + \sigma_y^2}, \quad (6)$$

where $\sigma_x^2$ and $\sigma_y^2$ are, respectively, the variances of the horizontal and vertical components of the disparity vectors inside the window 502.

The diffusivity $f(.)$ in Equation (4) is now defined as function of a $\zeta$-weighted image gradient $\|\nabla I\|_\zeta$. That is, at each sampling position z the magnitude of the image gradient is weighted by its local disparity variance $\zeta(z)$. So if $\zeta_{max}$ is the maximum variance of the considered disparity field and $g:[0, \zeta_{max}] \to [0,1]$, that is any increasing control function satisfying the two conditions $g(0)=0$ and $g(\zeta_{max})=1$, then:

$$\|\nabla I\|_\zeta^2 = g(\zeta(z))\|\nabla I\|^2. \quad (7)$$

There are several choices for the control function g. For example a suitable family of functions is given by:

$$g(v) = \begin{cases} (v/\sigma_{max}^2)^n & \text{if } v \leq C \\ 1 & \text{otherwise} \end{cases}, \quad (8)$$

where $C\epsilon(0, 1)$ is a threshold modulating the influence of $\zeta$ in the diffusion process.

Applying the parabolic diffusion Equation (3) with diffusivity function $f(\|\nabla I(x,y,t)\|_\zeta^2)$ an iterative disparity-driven or depth-driven diffusion process model is defined.

Figure 5D:
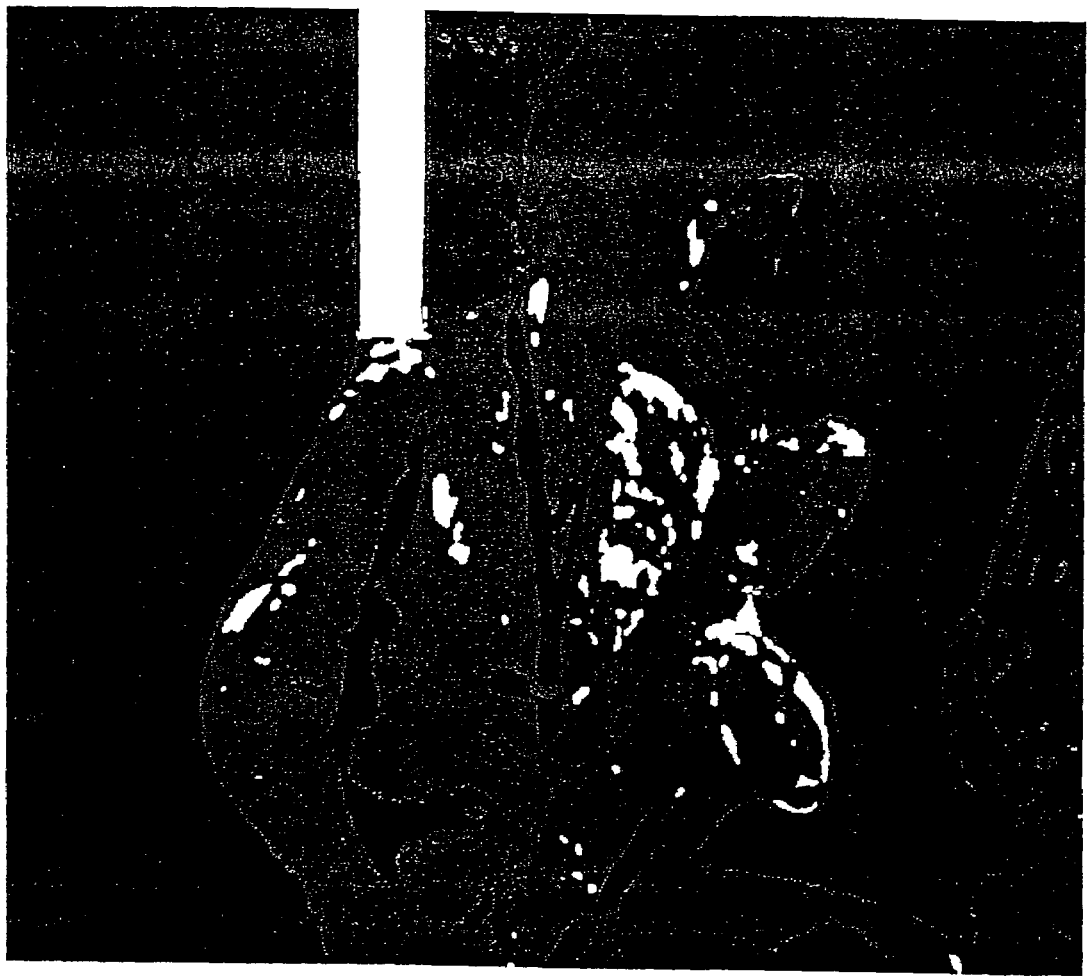

FIG. 5d shows a simplified image of FIG. 5a when disparity-controlled diffusion is applied according to the above mathematical model.

Figure 5E:

It can be seen from FIG. 5d that the above-described disparity-driven non-linear diffusion model is particularly appropriate for both object segmentation and pattern recognition image processing. Masks of complete physical objects can easily be extracted from the processed images using known histogram-based thresholding methods. An example of an extracted mask of the image of FIG. 5a is shown in FIG. 5e.

Although the present invention has been described with reference to stereoscopic disparity-driven non-linear diffusion it will be understood that other embodiments of the present invention could be readily implemented by the person skilled in the art without further inventive contribution. For example, the depth values could instead be obtained by using an active imaging device comprising a low power laser range finder to simultaneously obtain depth information relevant to respective pixels in an image or image sequence. In addition the data-driven aspects of the above described non-linear diffusion process could be readily implemented for video sequences using motion values instead of the disparity values and determined in a similar way as the disparity values but using monoscopic sequential frames of a video sequence instead of stereoscopic image pairs, for example.

What is claimed is:

1. A method for processing an image recorded by an imaging device, said method comprising the steps of:
    a) providing an image comprising an array of adjacent elements each corresponding to a respective part of the image and having a respective intensity value associated therewith;
    b) processing said intensity values to determine an intensity contrast value for each respective element according to differences in intensity values between respective adjacent elements;
    c) providing depth information for each element corresponding to the distance between the imaging device and at least part of an image forming object represented in the image by the respective element;
    d) processing said depth information to determine a depth contrast value for each respective element according to differences in depth in the vicinity of the respective element; modifying the respective intensity contrast values according to the respective depth contrast values, and altering the intensity values of the respective elements towards an average intensity value determined by intensity values of surrounding elements if the respective modified intensity contrast value of the element is below a threshold value; and
    e) processing said altered intensity contrast values to identify at least one area of the image corresponding to one or more respective objects in the image being processed.

2. A method according to claim 1 wherein said depth values are determined according to the spacing between corresponding points on a stereoscopic image pair.

3. A method according to claim 2 wherein the spacing between said points is determined by matching said corresponding points and estimating a vector value for the relative spacing and direction of said points.

4. A method according to claim 1 wherein said area is determined by identifying an outline of said respective object or objects in the image.

5. A method according to claim 1 wherein the intensity contrast values are modified such that elements having a higher than average depth contrast value have their respective intensity values altered less than elements having a lower than average depth contrast value.

6. A method according to claim 1 wherein step e) comprises a non-linear diffusion process for altering element intensity values in accordance with respective intensity contrast values modified in accordance with respective depth contrast values.

7. An image processing system for processing an image recorded by an imaging device; said system comprising:
    a data receiver for receiving data relating to an image comprising an array of adjacent elements each corresponding to a respective part of the image and having a respective intensity value associated therewith;

an intensity value processor configured to determine an intensity contrast value for each respective element according to differences in intensity values between respective adjacent elements;

a depth value processor configured to determine depth information for each element corresponding to the distance between the imaging device and at least part of an image forming object represented in the image by the respective element;

a depth contrast value processor configured to determine a depth contrast value for each respective element according to differences in depth in the vicinity of the respective element;

a processor configured to modifying the respective intensity contrast values according to the respective depth contrast values, and alter the intensity values of the respective elements toward an average intensity value determined by intensity values of surrounding elements if the respective modified intensity contrast value of the element is below a threshold value; and an object segment processor configured to process said altered intensity contrast values to identify at least one area of the image corresponding to one or more respective objects in the image being processed.

8. A method of processing an image represented by an array of intensity values each representing a respective picture element, said method comprising:
   (a) processing said intensity values to obtain for each picture element an intensity contrast value according to differences in intensity values between respective adjacent picture elements;
   (b) comparing the image with a second image of the same subject captured at a different spatial or temporal position to obtain for respective picture elements disparity vectors indicative of offsets between corresponding content in the two images;
   (c) processing said disparity vectors to obtain a disparity measure for each picture element;
   (d) smoothing the image by applying to the intensity values an anisotropic diffusion process in which the diffusivity is a function of said intensity contrast value and of said disparity measure, whereby less diffusion occurs across regions having relatively high intensity contrast and relatively high disparity than in regions having relatively low contrast and relatively low disparity.

9. A method according to claim 8 in which the disparity measure for each picture element is a function of the variances of the components of the disparity vector within a window centered on that element.

10. A method according to claim 8 in which the diffusivity is a function of the product of the intensity contrast value and the disparity measure.

11. A method according to claim 8 in which the two images are a stereoscopic image pair and the disparity vectors are determined by matching corresponding points in the two images and estimating a vector value for the relative spacing and direction of the two points.

12. A method according to claim 8 in which the two images are respective images of a video sequence and the disparity vectors are motion vectors.

13. An apparatus for processing an image represented by an array of intensity values each representing a respective picture element, said apparatus comprising:
   (a) means operable to process said intensity values to obtain for each picture element an intensity contrast value according to differences in intensity values between respective adjacent picture elements;
   (b) means operable to compare the image with a second image of the same subject captured at a different spatial or temporal position to obtain for respective picture elements disparity vectors indicative of offsets between corresponding content in the two images;
   (c) means operable to process said disparity vectors to obtain a disparity measure for each picture element;
   (d) means operable to smooth the image by applying to the intensity values an anisotropic diffusion process in which the diffusivity is a function of said intensity contrast value and of said disparity measure, whereby less diffusion occurs across regions having relatively high intensity contrast and relatively high disparity than in regions having relatively low contrast and relatively low disparity.

14. An apparatus according to claim 13 in which the disparity measure for each picture element is a function of the variances of the components of the disparity vector within a window centered on that element.

15. An apparatus according to claim 13 in which the diffusivity is a function of the product of (a) the intensity contrast value and (b) a function of the disparity measure.

16. An apparatus according to claim 13 in which the two images are a stereoscopic image pair and the disparity vectors are determined by matching corresponding points in the two images and estimating a vector value for the relative spacing and direction of the two points.

17. An apparatus according to claim 13 in which the two images are respective images of a video sequence and the disparity vectors are motion vectors.

* * * * *